J. H. GEORGE AND E. A. HAWTHORNE.
LIGHTING APPARATUS.
APPLICATION FILED JAN. 18, 1919.
1,379,337.
Patented May 24, 1921.
5 SHEETS—SHEET 1.
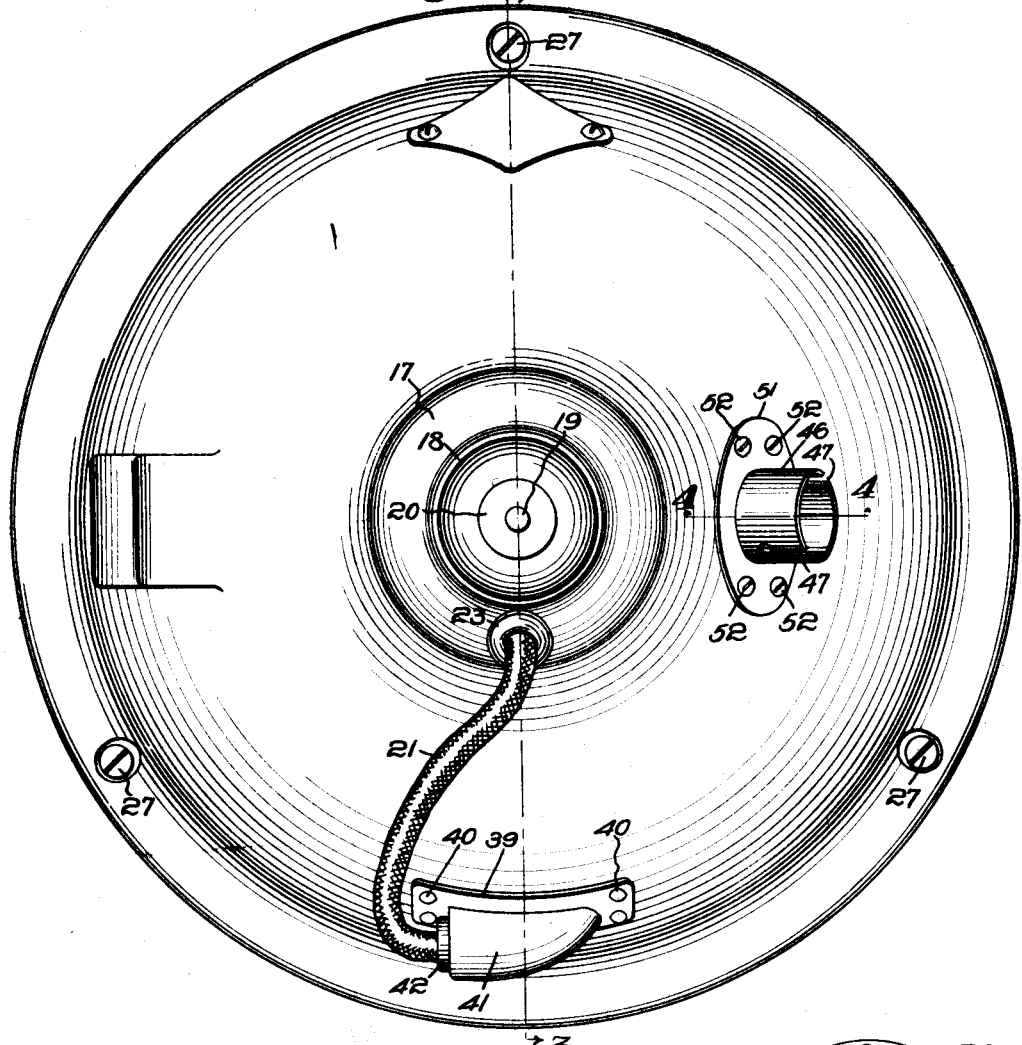
Fig. 1.
Fig. 2.
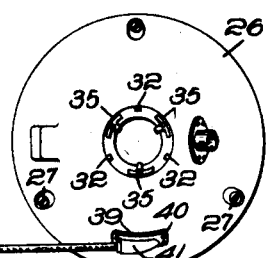
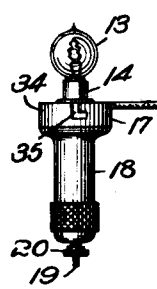
Inventors:
John H. George,
Ellsworth A. Hawthorne
by
Attys.

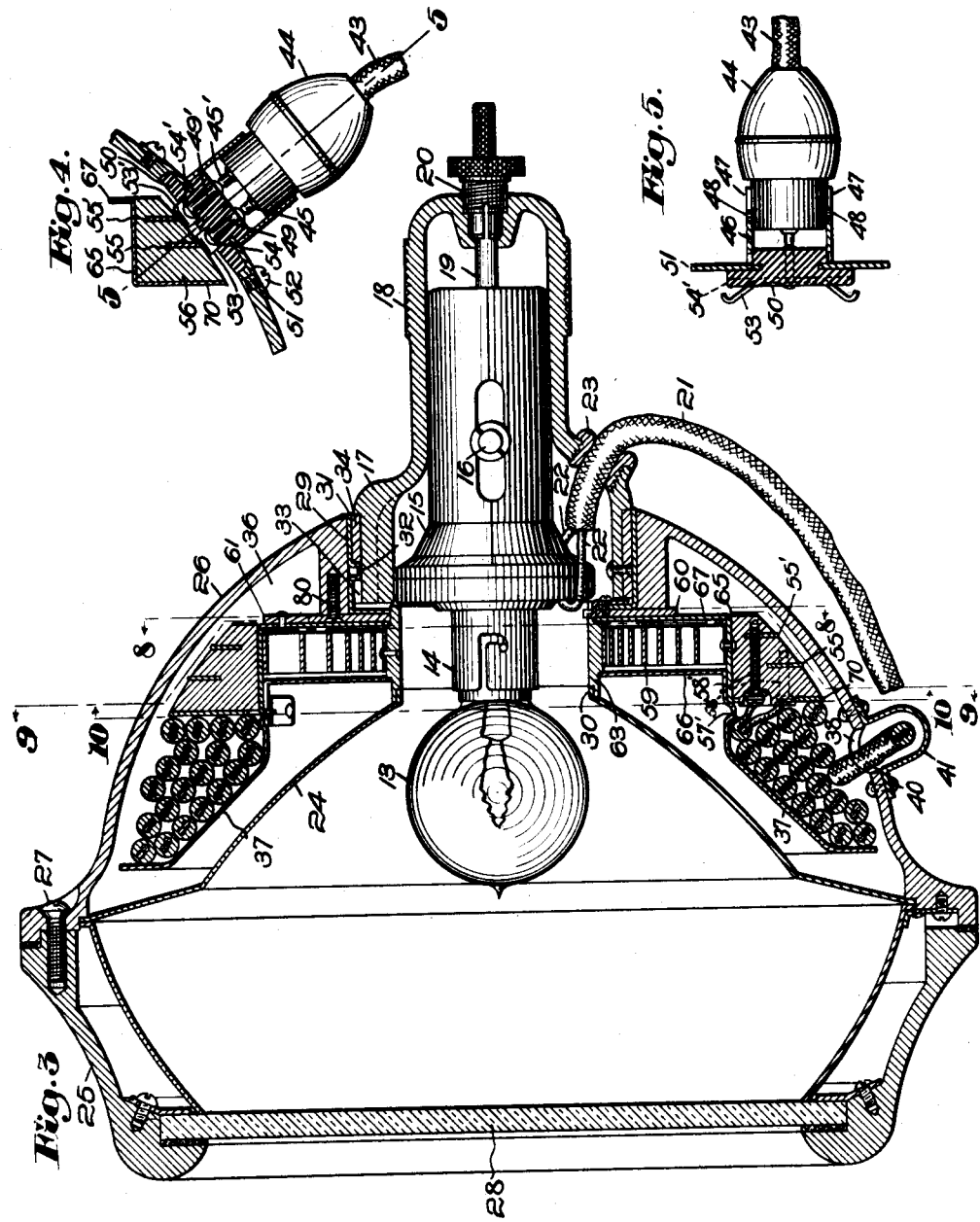

J. H. GEORGE AND E. A. HAWTHORNE.
LIGHTING APPARATUS.
APPLICATION FILED JAN. 18, 1919.
1,379,337.
Patented May 24, 1921.
5 SHEETS—SHEET 3.
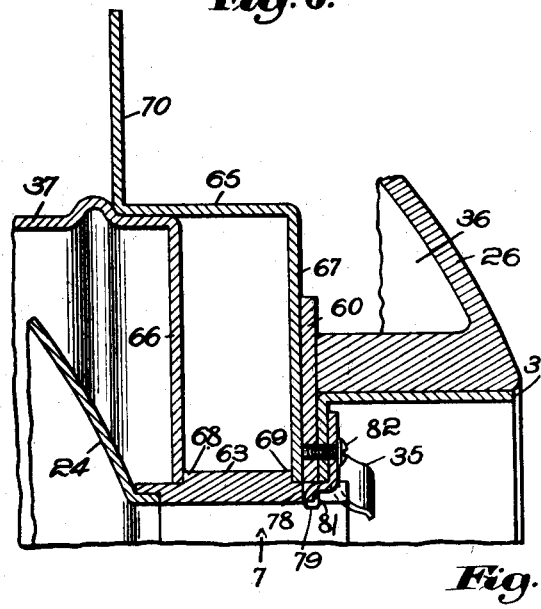
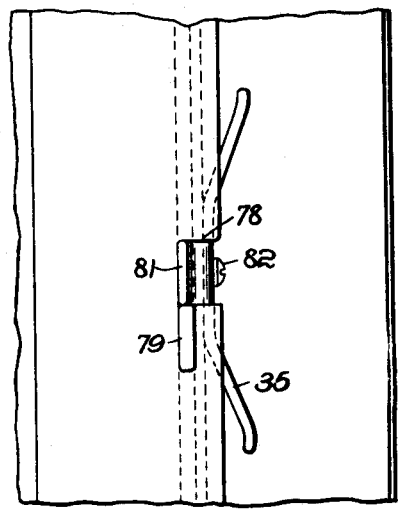
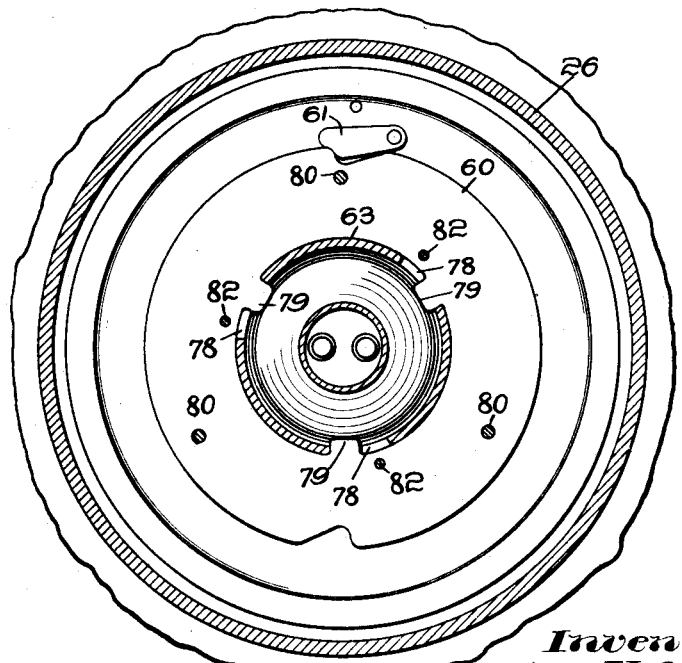
Inventors:
John H. George,
Ellsworth A. Hawthorne
by Emery, Booth, Janney & Varney.
Attys.

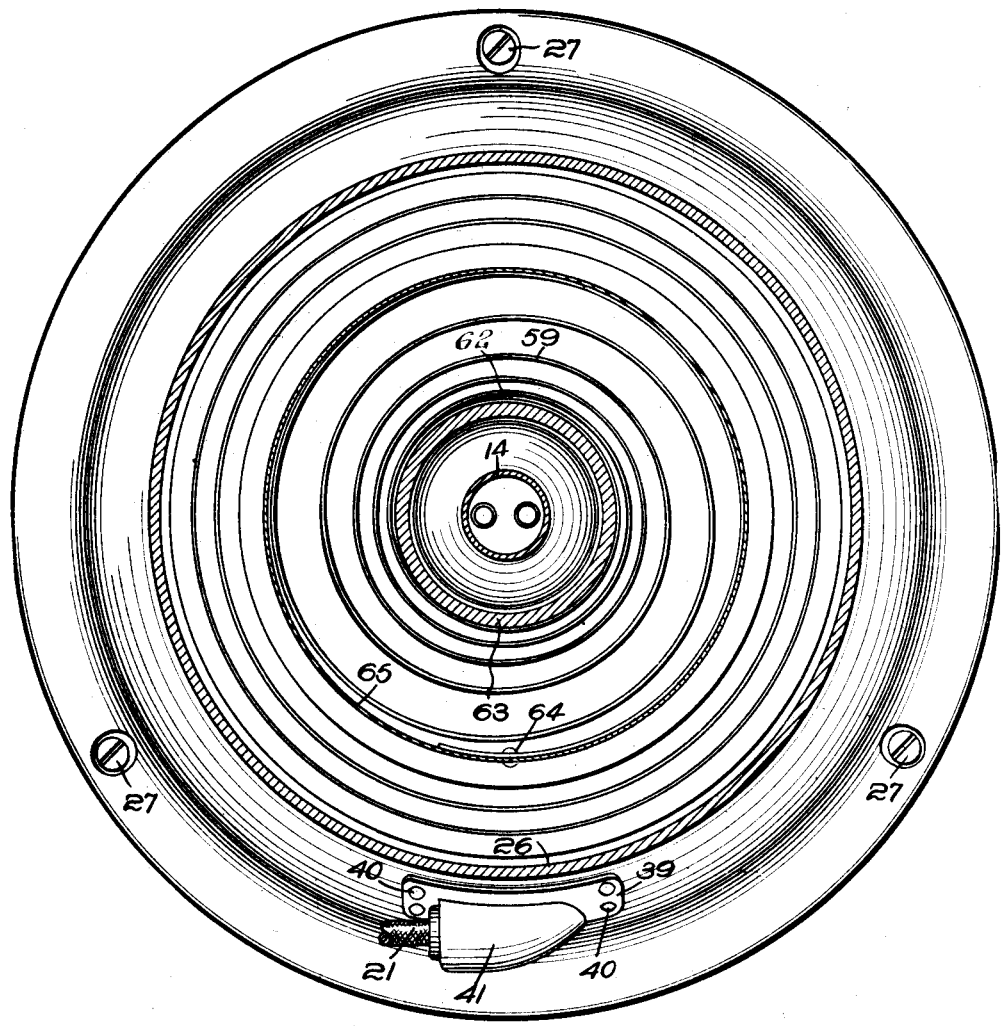

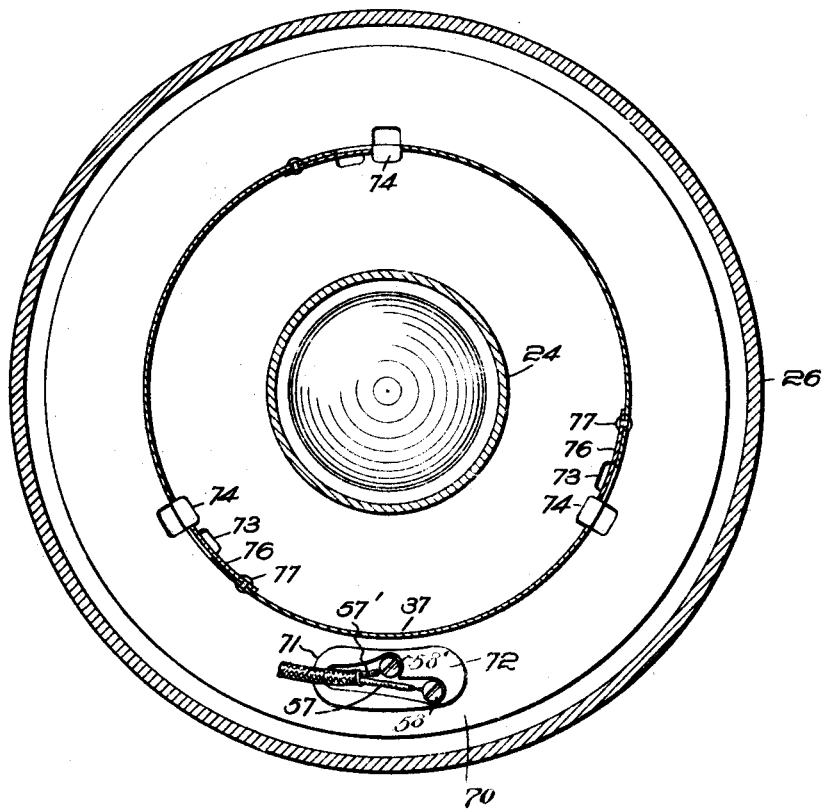

UNITED STATES PATENT OFFICE.

JOHN H. GEORGE AND ELLSWORTH A. HAWTHORNE, OF BRIDGEPORT, CONNECTICUT; SAID GEORGE ASSIGNOR TO SAID HAWTHORNE.

LIGHTING APPARATUS.

1,379,337.      Specification of Letters Patent.      Patented May 24, 1921.

Application filed January 18, 1919. Serial No. 271,858.

*To all whom it may concern:*

Be it known that we, JOHN H. GEORGE, a subject of the King of Great Britain, and ELLSWORTH A. HAWTHORNE, a citizen of the United States, both residents of Bridgeport, in the county of Fairfield and State of Connecticut, have invented an Improvement in Lighting Apparatus, of which the following description, in connection with the accompanying drawings, is a specification, like characters on the drawings representing like parts.

This invention relates to lighting apparatus of the class in which a light-source is associated with a housing having light-concentrating and projecting means, usually a parabolic reflector, and our invention is more particularly concerned with provision for permitting the light-source to be dismounted from its normal position and moved about from place to place, while still connected to its source of supply.

Our invention will be best understood by reference to the following description, when taken in connection with the accompanying drawings of one specific embodiment thereof, while its scope will be more particularly pointed out in the appended claims.

In the drawings:

Figure 1 is a rear elevation of a lighting apparatus embodying our invention, showing the same completely assembled;

Fig. 2 is an elevation of the apparatus showing the same as it appears when the light-source unit is dismounted and carried some distance from its mounting, while still connected thereto by the light-source supply conductor;

Fig. 3 is a sectional view on line 3—3 of Fig. 1;

Fig. 4 is a sectional view on line 4—4 of Fig. 1;

Fig. 5 is a sectional view on line 5—5 of Fig. 4;

Fig. 6 is a detail sectional view on an enlarged scale taken in a radial plane containing the axis of the lamp;

Fig. 7 is a detail elevation of the parts shown in Fig. 6, viewed in the direction of the arrow 7 in Fig. 6;

Fig. 8 is a sectional view on line 8—8 of Fig. 3, looking toward the left;

Fig. 9 is a sectional view on line 9—9 of Fig. 3, looking toward the left;

Fig. 10 is a sectional view on line 10—10 of Fig. 3, looking toward the right;

Fig. 11 is a detail sectional view on an enlarged scale on line 3—3 of Fig. 1; and Fig. 12 is a sectional view on line 12—12 of Fig. 11.

Referring to the drawings, and to the lighting apparatus which is illustrated therein, we have shown for purposes of exemplification a lamp of the class commonly known as dirigible searchlights or spotlights, although it should be distinctly understood that our invention is by no means limited to lamps of this class, but is susceptible of more general application. In the embodiment herein shown, we have provided a light-source unit and a light-reflecting unit, separable one from the other thereby to permit the light-source unit to be dismounted and moved about from place to place as an inspection lamp. In the present example, the light-source unit comprises a suitable light-source, herein an incandescent lamp bulb 13, having its base mounted in an appropriate socket 14, the latter being carried by a suitable light-source carrier, herein an insulating mounting 15, which may be the mounting of a lamp-controlling switch of any desired construction, the same being herein provided with push buttons 16. The mounting 15 is herein mounted in a casing 17, which may be provided with a suitable handle 18, and the latter may serve two purposes; first, to facilitate turning the dirigible lamp to and fro, and second, to permit the light-source unit to be dismounted and carried about. It may be added that the light-source is mounted to move axially for focusing purposes, and to that end, the mounting 15 is axially slidable in the casing 17, and is provided with a rearwardly extending focusing rod 19, which may be secured in the desired position of adjustment by a clamping means, herein comprising a threaded expansible and contractible sleeve or bushing 20 of known construction.

Leading to the lamp switch is a suitable flexible conductor, herein a cable 21 containing two conducting wires 22, which may be connected to the terminals of the bulb 13 in any suitable manner, which it is unnecessary here to describe. The cable 21 extends through a suitable opening provided in the casing 17, and if desired, there may be provided a suitable bushing 23 encircling the cable and threaded into the opening. In practice, this bushing will usually be formed of rubber or other insulating material. It should be understood, of course, that the cable 21 is provided with a usual insulating cover.

The mounting for the light-source unit in the present embodiment comprises a light-reflecting unit having an appropriate reflecting surface, herein a usual parabolic reflector 24, associated with the light-source 13. The light-reflecting unit also includes a suitable housing, herein comprising front and rear casing parts 25 and 26, suitably secured together, as by screws 27, the front part or door, sometimes called a bezel, being provided with a suitable glazing 28.

The light-source and light-reflecting units may be separably united, as by providing the rear casing part 26 with an axial circular opening 29 forming a socket in which the casing 17 is received. The latter may be introduced and withdrawn by movement in an axial direction. In order to permit the lamp bulb to be withdrawn rearwardly from the reflector 24, the latter is herein provided with a central opening 30, slightly larger in diameter than the bulb. The two units may be suitably attached together, as by a bayonet joint, and to this end, the opening 29 is herein provided with a lining 31 having a plurality of inwardly projecting lugs 32, adapted for coöperation with bayonet slots 33, herein formed in a ring 34 encircling and secured to the casing 17. The two parts of the bayonet joint are united in an obvious manner by causing the lugs 32 to register with the longitudinal portions of the bayonet slots 33, then relatively moving the parts axially, and finally turning one on the other to bring the lugs into the circumferential portions of the bayonet slots. As a means to prevent accidental disengagement of the bayonet joint, we may provide one or more, herein a plurality of suitable springs 35 pressing endwise in an outward direction against inner end of the casing 17, and providing a frictional resistance tending to prevent relative rotation of the parts of the bayonet joint. It should be understood, of course, that in the assembling of the parts of the joint, these springs are tensioned, and hence constantly tend to move the socket parts axially in opposite directions, thereby to produce the desired frictional resistance to their turning movement.

The lamp casing and the reflector form a chamber 36, in which a cable take-up device is received. This take-up device may take various forms, but in the present example comprises a reel or drum 37, arranged in co-axial relationship with the reflector, and having a portion encircling a portion of said reflector. In other words, the reflector and drum are nested together in such a way as to economize space. The cable 21 is wound on the drum 37, and may extend from the latter through a suitable opening in the lamp casing. In the present example, the cable extends through an opening 38 shown in Fig. 3, and there is provided a suitable guide for the cable where the latter emerges from the casing. In the present embodiment, we have provided for this purpose a plate 39 secured to the casing as by rivets 40, and provided with a hollow projection 41 suitably shaped to permit the cable to lead in a generally tangential direction from the drum. If desired, a suitable bushing 42 may be provided to receive the cable at the point where the latter emerges, as shown in Fig. 1. It should now be apparent that, by grasping the handle 18 and detaching the casing 17 from the body of the lamp casing, the cable may be unwound from its drum and the lamp bulb 13 moved about from place to place and to a distance limited only by the length of the cable.

In order to maintain electrical connection between the cable 21 and the source of current at all times during the rotation of the drum, we have provided suitable means carried by the drum and coöperating with suitable means mounted on the lamp casing. Leading from the source of current (not shown) is a cable 43 (see Fig. 4), having a well-known terminal plug 44 provided with usual spring-pressed plungers 45 and 45'. The plug is fitted into a usual socket 46 provided with bayonet slots 47 to receive laterally projecting pins 48 carried by the plug. The spring-plungers act in a well-known manner to maintain the pins 48 properly seated in their bayonet slots 47. The spring-plungers also serve as conductors connected to the wires of the cable 43.

Mounted in the socket 46 are two fixed contact members 49 and 49', which are insulated from the socket by an appropriate insulating mounting 50. The socket may be suitably secured to the casing part 26 as by the provision of a flange 51 secured in place by screws 52. Electrically connected with the contact members 49 and 49' are suitable yielding contact members 53 and 53', which may be of any suitable form, but in the present example are generally bow-shaped. These contact members, which are leaf-springs, are mounted on the insulating mounting 50, and may be secured thereto in any suitable manner, as by perforating the same to receive the members 49 and 49' which, in the present example, are made in the form of rivets, as clearly shown in Fig. 4. The members 53 and 53' may be held against turning movement on their respective rivets, as by providing the insulating mounting 50 with shallow grooves 54 and 54' to receive said members. The yielding contact members 53 and 53' may coöperate with suitable annular conductors carried by and appropriately insulated from the drum 37, and connected respectively with the wires of the cable 21. To this end, we have provided two conducting rings 55 and 55' embedded in an insulating ring 56. The rings 55 and 55' have their peripheries exposed and preferably projecting slightly above the periphery of the insulating ring 56, and coöperating respectively with the yielding contacts 53 and 53', as shown in Fig. 4. It should now be evident that as the drum 37 rotates, carrying with it the conducting rings 55 and 55', electrical connection is maintained between said rings and the respective wires of the cable 43, which cable leads from the source of current. The conducting rings may be suitably connected to the wires 57 and 57' of the cable 21, as by the provision of screws 58 and 58' threaded into the respective rings, and receiving said wires about their heads. Thus, it is apparent that electrical connection is at all times maintained between the electric lamp 13 and the source of current.

Preferably the cable take-up device is automatic; that is to say, it is self-winding, self-locking in the desired position, and capable of being set in motion or stopped by simply manipulating the cable 21 after the manner of an ordinary roller window-shade. To this end, we have provided a spirally-wound spring 59, a ratchet 60 secured to the casing, and a pawl 61 carried by the winding drum. One end of the spring (see Fig. 9) is secured as by a rivet 62 to a stationary part, herein a bearing sleeve 63 for the drum 37, while the other end is secured as by a rivet 64 to a ring 65, the latter in turn being suitably secured to the drum 37. The latter receives its support from and is mounted to turn about the bearing sleeve 63. and to that end, the drum 37 and ring 65 are provided, respectively, with inwardly projecting annular flanges 66 and 67 which, as clearly shown in Figs. 3 and 6, are mounted to turn on the bearing sleeve 63, the latter being preferably provided with shoulders 68 and 69 (see Fig. 6) to prevent axial movement of the flanges thereon. Preferably, the ring 65 is provided with an outwardly projecting flange 70 having an aperture 71 (see Fig. 10) to receive a projection 72 on the insulating ring 56, as best shown in section at the lower part of Fig. 3. In this way, the insulating ring and its mounting are interlocked and held against relative turning movement one on the other. In practice, the insulating ring will usually be formed by molding the same of some suitable plastic insulating compound. This mode of manufacture is preferred, because it enables the conducting rings 55 and 55' and the screws 58 and 58' to be molded in place on the ring 65, all in one operation.

It has already been stated that the ring 65 is suitably secured to the drum 37. The preferred means of attachment is a bayonet joint, and to this end the drum 37 is herein provided with a plurality of bayonet slots 73 to receive corresponding, inwardly-projecting tongues 74 formed on the ring 65, as best shown in Figs. 10, 11 and 12. The drum 37 and ring 65 are assembled in an obvious manner by relative movement in an axial direction to carry the lugs 74 into the openings of the bayonet slots 73, and then turning the parts one on the other to cause them to interlock as shown in Fig. 12. When in this position, the parts may be positively locked against relative rotation by the provision of a suitable locking member 76. In the present example, this locking member is in the form of a leaf-spring secured to the drum 37 as by a rivet 77. Normally, one end of this spring abuts against one of the lugs 74 and locks the latter securely in its place. Release of the lug may be effected by simply lifting the spring out of the path of the lug by the use of a suitable implement such as a screw-driver or knife, whereupon the drum 37 and ring 65 may be taken apart.

The bearing ring 63 is preferably secured in its place by a bayonet joint similar to that just described. Referring to Figs. 6, 7 and 8, the bearing ring is herein provided with a plurality of bayonet slots 78 to receive corresponding lugs 79 projecting inwardly from the ratchet ring 60. The latter may be suitably secured to the casing at 26, as by screws 80. The parts are assembled in an obvious manner by first causing the lugs 79 to register with the openings of the bayonet slots 78, then moving the parts axially one with relation to the other, and finally turning one upon the other to cause the lugs to bring up in the ends of the circumferential portions of the bayonet slots, as clearly shown in Fig. 7. The lugs may be normally locked in such position by the provision of suitable locking members 81, which in the present example are tongues formed integrally with the springs 35 and projecting into the paths of the lugs 79, so that rotation of the latter is impossible without first removing the tongues. To this end, the springs 35 are secured in place by the screws 82, whose removal permits the springs to be lifted out of their places, whereupon the lugs of the bayonet joint are free to be rotated in their respective slots.

The general operation of the apparatus is as follows: Normally, the two units are assembled as shown in Fig. 3, and when so used operate as an ordinary dirigible searchlight or spotlight. The apparatus is especially useful on motor cars, and when so used possesses all of the advantages of an ordinary spotlight and an inspection lamp for enabling the user to inspect, adjust and repair various parts of the motor car. When the lamp is to be used for this purpose, the user grasps the handle 18, rotates the same in the proper direction to detach the casing 17 from the casing 26, and withdraws the lamp bulb rearwardly through the opening provided therefor. The user then draws out the cable 21 to the required extent, and in so doing winds the spring 59. It should be understood that the pawl 61 is thrown out of engagement with the ratchet 60 by centrifugal force when the drum 37 rotates at a sufficiently high speed, but when the speed becomes reduced to a predetermined point, the pawl, if on the upper side of the ratchet, will gravitate into interlocking engagement with the teeth of the latter, as will be evident from an inspection of Fig. 8. As before stated, the operation is similar to that of an ordinary window-shade. The lamp is restored to its normal position by a reversal of the foregoing operation, it being understood, of course, that the cable is rewound on its drum by simply giving the cable a quick jerk, then releasing the same and allowing the drum to wind on the cable under the influence of the spring.

Having thus described one embodiment of our invention, what we claim and desire by Letters Patent to secure is:

1. A lighting apparatus comprising, in combination, a light-source unit and a light-reflecting unit normally coöperating with, but separable one from the other, and light-source supply means comprising a conductor having a terminal supported on said light-reflecting unit independently of said light-source unit, and a flexible, light-source supply conductor connecting said terminal to said light-source.

2. A lighting apparatus comprising, in combination, a lamp-housing having a reflector therein, a lamp normally housed in said housing and associated with said reflector but removable therefrom for use as a portable lamp, and lamp-supply conducting means including a terminal mounted on said housing and a flexible conductor connecting said lamp to said terminal and supplying said lamp when the latter is removed from said housing and from its association with said reflector as well as when housed therein.

3. A lighting apparatus comprising, in combination, a lamp-housing having a reflector therein and provided with an opening at the rear thereof, a lamp normally housed in said housing and associated with said reflector but removable rearwardly therefrom for use as a portable lamp, and lamp-supply conducting means including a terminal mounted on said lamp-housing and a flexible conductor connecting said terminal to said lamp and supplying said lamp when the latter is removed from said housing and from its association with said reflector as well as when housed therein.

4. A lighting apparatus comprising, in combination, a lamp-housing having a reflector therein and provided with an opening at the rear thereof, a lamp normally housed in said housing and associated with said reflector but removable rearwardly therefrom for use as a portable lamp, and lamp-supply conducting means including a terminal mounted on said lamp-housing and a flexible conductor connecting said terminal to said lamp and supplying said lamp when the latter is removed from said housing and from its association with said reflector as well as when housed therein, said lamp-housing having a support for the slack of said conductor when said lamp is housed in said housing.

5. A lighting apparatus comprising, in combination, a lamp-housing having a reflector therein and provided with an opening at the rear thereof, a lamp normally housed in said housing and associated with said reflector but removable rearwardly therefrom for use as a portable lamp, lamp-supply conducting means including a terminal mounted on said lamp-housing and a flexible conductor connecting said terminal to said lamp and supplying said lamp when the latter is removed from said housing and from its association with said reflector as well as when housed therein, and means interposed between said lamp and said terminal for taking up the slack of said conductor when said lamp is restored to its association with said reflector.

6. A lighting apparatus comprising, in combination, an electric lamp, a casing having a reflector associated therewith and provided with a rear opening through which said lamp is removable, said casing forming with said reflector a chamber, a drum mounted in said chamber about said opening, a flexible conductor connected to said lamp and wound on said drum, and means presenting a bearing on which said drum is mounted for rotation to wind and unwind said conductor.

7. A lighting apparatus comprising, in combination, an electric lamp, a reflector associated therewith and provided with a rear opening, a casing forming with said reflector a chamber, a drum mounted in said chamber in coaxial relationship with said reflector and lamp, said lamp being rearwardly removable through said opening and drum, and a flexible conductor connected to said lamp and wound on said drum.

8. A lighting apparatus comprising, in combination, an electric lamp, a reflector associated therewith and provided with a rear opening, a casing forming with said reflector a chamber, a drum mounted in said chamber and having a portion encircling a portion of said reflector, said lamp being rearwardly removable through said opening and drum, and a flexible conductor connected to said lamp and wound on said drum.

9. A lighting apparatus comprising, in combination, a reflector, an electric lamp associated therewith and removable rearwardly therefrom, a casing forming with said reflector a chamber, a drum mounted in said chamber, a main conductor, a flexible conductor distinct from said main conductor, wound on said drum and attached to said lamp, and relatively movable conductors including a conductor encircling a portion of said reflector, to maintain electrical connection between said main conductor and said flexible conductor during the rotation of said drum.

10. A lighting apparatus comprising, in combination, a light-source unit and a light-reflecting unit separable one from the other, a light-source supply conductor attached to said light-reflecting unit, and a flexible, light-source supply conductor electrically connecting the first-mentioned conductor to said light-source, said light-reflecting unit comprising a reflector associated with said light-source, a casing forming with said reflector a chamber at the rear of said reflector, a drum housed in said chamber and serving as a reel on which said flexible conductor is wound, a bearing sleeve on which said drum is mounted to turn, a drum-rotating spring having one end secured to said drum and the other to said sleeve, a pawl and ratchet to hold said drum against rotation, and means to maintain electrical connection between said conductors during the rotation of said drum, said means including a conducting ring carried by said drum and connected to said flexible conductor, and a contact member engaging said ring and connected to the other conductor.

11. A lighting apparatus comprising, in combination, a light-source unit and a light-reflecting unit separable one from the other, a light-source supply conductor attached to said light-reflecting unit, and a flexible, light-source supply conductor electrically connecting the first-mentioned conductor to said light-source, said light-reflecting unit comprising a reflector associated with said light-source, a casing forming with said reflector a chamber at the rear of said reflector, a drum housed in said chamber and serving as a reel on which said flexible conductor is wound, a bearing sleeve on which said drum is mounted to turn, a drum-rotating spring having one end secured to said drum and the other to said sleeve, a pawl and ratchet to hold said drum against rotation, and means to maintain electrical connection between said conductors during the rotation of said drum, said means including a pair of conducting rings insulated from each other and a pair of contact members engaging said rings, respectively.

12. A lighting apparatus comprising, in combination, a light reflecting unit having a drum housed therein, a light-source unit comprising a light-source normally housed in said light-reflecting unit but removable therefrom and from said drum for use as a portable lamp, and a flexible light source supply conductor wound on said drum, attached to said light-source unit, and arranged to be wound onto and unwound from said drum in moving said light source unit as a portable lamp.

13. A lighting apparatus comprising, in combination, a light-reflecting unit provided with a lateral opening, a light-source unit separable rearwardly from said light-reflecting unit for use as a portable lamp, a drum mounted within said light-reflecting unit, a flexible light-source supply conductor attached to said light-source unit, and means within said light-reflecting unit to operate said drum to cause said conductor to be wound onto and unwound from said drum through said opening.

14. A lighting apparatus comprising, in combination, a light-reflecting unit provided with a lateral opening, a light-source unit separable rearwardly from said light-reflecting unit, a drum mounted within said light-reflecting unit, and a flexible light-source supply conductor having one end attached to said light-source unit and extending therefrom through said opening to the interior of said light-reflecting unit where it is wound on said drum and arranged to be wound onto and unwound from said drum through said opening.

In testimony whereof, we have signed our names to this specification.

JOHN H. GEORGE.
ELLSWORTH A. HAWTHORNE.